United States Patent [19]

Schmidt et al.

[11] Patent Number: 4,510,167

[45] Date of Patent: Apr. 9, 1985

[54] MARGARINE FAT BLEND

[75] Inventors: Werner J. Schmidt, Hamburg, Fed. Rep. of Germany; Willem Dijkshoorn, Vlaardingen, Netherlands; Wilhelm Stratmann, Crema, Italy; Leo F. Vermaas, Maassluis, Netherlands

[73] Assignee: Lever Brothers Company, New York, N.Y.

[21] Appl. No.: 554,473

[22] Filed: Nov. 22, 1983

[30] Foreign Application Priority Data

Nov. 22, 1982 [GB] United Kingdom ............ 8233218

[51] Int. Cl.³ .................................................. A23D 5/00
[52] U.S. Cl. .......................................................... 426/607
[58] Field of Search ................................. 426/606, 607

[56] References Cited

U.S. PATENT DOCUMENTS

| 3,956,522 | 5/1976 | Kattenberg et al. | 426/607 X |
|---|---|---|---|
| 4,087,564 | 5/1978 | Poot et al. | 426/607 X |
| 4,230,737 | 10/1980 | Heider | 426/607 |
| 4,316,919 | 2/1982 | Pelloso et al. | 426/607 X |
| 4,360,536 | 11/1982 | Keuning et al. | 426/607 X |
| 4,425,371 | 1/1984 | Stratmann et al. | 426/607 X |

FOREIGN PATENT DOCUMENTS 0070050  1/1983  European Pat. Off.
1121662  7/1968  United Kingdom.

Primary Examiner—Robert Yoncoskie
Attorney, Agent, or Firm—Milton L. Honig; James J. Farrell

[57] ABSTRACT

A margarine fat with a low level of triglycerides from fatty acids in the trans-configuration is produced from vegetable oils, and preferably from one type of oil, by a process involving (a) random interesterification of a saturated fat with an unsaturated oil, (b) fractionation of the interesterified mixture to remove high melting components (stearin) and (c) optionally mixing appropriate amounts of the low melting components (olein), interesterified mixture and non-hydrogenated or partly hydrogenated oils.

1 Claim, No Drawings

MARGARINE FAT BLEND

The present invention relates to a margarine fat, particularly to margarines and spreads containing said fat and to a process for producing said margarine fat.

More particularly the invention relates to a margarine fat and margarines preferably exclusively consisting of vegetable oils and ideally of vegetable oils originating from one and the same source.

There is need for margarines, particularly vegetable margarines which (a) spread easily, (b) contain a relatively high proportion of unsaturated fatty acids, (c) have good organoleptic properties, i.e. a good melting behaviour under temperature conditions prevailing in the mouth which is comparable to that achieved with lauric fats, and (d) have a relatively low transfatty acid level, e.g. a level not exceeding 15% and preferably a level equal to or somewhat lower than 10%.

There is also need for an economical process for producing a margarine fat which is useful for preparing margarines meeting the above requirements.

Applicants have found a margarine fat which to a large extent meets the above requirements. The margarine fat according to the invention is characterized in that (a) the level of triglycerides from 3 saturated fatty acids with 16 or 18 carbon atoms (hereafter abbreviated $S_3$), ranges from 0 to 6%, the level of triglycerides from unsaturated fatty acids with 16 or 18 carbon atoms (hereafter abbreviated $S_2U$) is higher than 15% and the ratio of $S_2U:S_3$ is at least 3, and (b) the level of saturated fatty acids with 18 carbon atoms (hereafter abbreviated $C_{18:0}$) is higher than 15%, the level of monounsaturated fatty acids with 18 carbons atoms (hereafter abbreviated $C_{18:1}$) is higher than 15%, the level of di-unsaturated fatty acids with 18 carbon atoms (hereafter abbreviated $C_{18:2}$) is higher than 30%, and the level of trans fatty acids ranges from 0 to 15%.

The level of $S_3$ triglycerides is kept at a minimum, since these triglycerides are responsible for waxiness on consumption of the fat. Therefore, the closer the level of $S_3$ is to 0, the better.

The preferred range for the level of $S_2U$ triglycerides is from 20 to 35%. This class of triglycerides is very important, since $S_2U$ triglycerides are mainly responsible for imparting to the margarine the desired consistency without detrimentally affecting its organoleptic properties.

The ratio of $S_2U:S_3$ is preferably higher than 6 and ideally higher than 10. Such ratios reflect an appropriate choice of starting materials and fractionation conditions and will lead to margarines having good melting properties under the temperature and shear conditions prevailing in the mouth, as well as a good plasticity.

The level of $C_{18:0}$ fatty acids preferably ranges from 20 to 33%, the level of $C_{18:1}$ preferably ranges from 20 to 30% and the level of $C_{18:2}$ preferably ranges from 40 to 55%, whereas the level of unsaturated fatty acids in the trans configuration preferably ranges from 5 to 9%. Triglycerides derived from these acids and having a melting point ranging from 28° to 43° C. promote a quick crystallization of the fat.

The fat solids profile of a margarine fat is a direct consequence of the selection of the triglycerides and fatty acids composition of the starting materials as defined above. The fat solids profile of the margarine fat according to the invention is expressed in the following values determined by nuclear magnetic resonance measurements at the indicated temperatures: $N_{10}=20-60$; $N_{20}=5-25$; $N_{30}\leqq 5$; $N_{35}\leqq 2$.

The coolness of the fat is generally expressed by the difference in fat solids at 15° C. and 25° C. The margarine fat according to the invention displays a coolness $N_{15}-N_{25}$ which is equal to and preferably higher than 15.

The margarine fat blends according to the invention have a hardness which is preferably higher than 150 g/cm² and ideally ranges from 300 to 1500 g/cm² when measured at 10° C.

The margarine fat blends according to the invention can be processed to margarines or low fat spreads after mixing with an aqueous phase by means of well-known methods involving working and cooling, preferably using surface-scraped coolers and resting tubes, e.g. a Votator apparatus.

The process for producing the above-defined margarine fats according to the invention comprises:

(a) randomly interesterifying a mixture containing 35-84 wt% of an oil (i) in which at least 20% of the fatty acid residues consist of linoleic acid and 16-65 wt% of an oil or fat (ii) in which at least 80% of the fatty acid residues are saturated and have a chain length of 16 or 18 carbon atoms, to obtain an interesterified mixture (A);

(b) fractionating interesterified mixture (A) at a temperature such as to yield a higher-melting stearin fraction which is enriched in triglycerides from trisaturated fatty acid residues and a lower-melting olein fraction (B) in which the level of triglycerides from trisaturated fatty acids ranges from 0 to 6%, based on the total mixture;

(c) mixing 20 to 100% of said olein fraction (B) with 0 to 60% of the interesterified mixture (A) and 0 to 65% of an oil (C) comprising an oil which is substantially free from crystallized fat at 10° C., or a mixture of said oil with an oil having a melting point ranging from 28° to 43° C., the sum of A+B+C being 100%.

Oil (i) preferably comprises a vegetable oil such as soybean oil, sunflower oil, safflower oil, rapeseed oil, cottonseed oil, maize oil, olive oil, etc. or mixtures thereof. For practical and economical reasons sunflower oil is preferred. Preferably oil (i) further comprises a proportion of oil hydrogenated to 28°-43° C.

The oil or fat (ii) preferably consists of any of the oils (i) or a mixture thereof, which has been hydrogenated to obtain a fat in which at least 80% of the fatty acid residues is saturated, under conditions avoiding trans fatty acids formation to a level exceeding 15% and preferably avoiding levels exceeding 10% (using e.g. a freshly precipitated Ni-catalyst). Oil or fat (ii) preferably has a melting point ranging from 50° to 70° C. and an iodine value of less than 10, preferably less than 5.

Oil (C) preferably comprises an oil (i), part of which consists of the same oil (i) hydrogenated to a melting point ranging from 28° to 43° C.

It is very convenient that oils (i), (ii) and (C) derive from the same source and ideally from sunflower oil, which is readily available at a reasonable price.

Random interesterification can be carried out in a way known per se, using as a catalyst a mixture of NaOH and glycerol or alkalimetals, their alloys, their hydroxides or alkoxides at a level of 0.01-0.5 wt% at 25°-175° C., preferably at a temperature ranging from 80°–140° C., using fats substantially free of moisture, i.e. fats containing less than about 0.01% of moisture.

The proportion of oil (ii) in the mixture to be interesterified should not be too high, in order to obtain a reasonable yield of the olein. On the other hand it should not be too low, since otherwise the level of solids at 10° C. of the olein would be too low. It is therefore important that oils (i) and (ii) are present in proportions within the given ranges.

The triglycerides present in the interesterified mixture preferably comprise (i) 30–60% of saturated $C_{16}$ or $C_{18}$ fatty acid residues, the remainder of said $C_{16}$ or $C_{18}$ fatty acids being unsaturated fatty acid residues, preferably of the linoleic type, and (ii) 3–20% of triglycerides derived from tri-saturated fatty acid residues.

The fractionation can be carried out in the presence of a solvent, in the presence of a detergent (Lanza fractionation) or in the absence of a solvent (dry-fractionation). The fractionation is preferably carried out under conditions such that the level of tri-saturated triglycerides derived from the saturated fatty acids in the olein fraction is less than 6%, preferably less than 3%. Preferably dry-fractionation is applied, e.g. in a pelletizer at a temperature ranging from 30° to 40° C., preferably from 32° to 38° C., to obtain an olein having the following fat solids profile: $N_{10}=25-60$; $N_{20}=8-30$; $N_{30}=1-7$; $N_{35}=0-4$, and a stearin having the following fat solids profile:

$N_{10}=45-70$
$N_{20}=43-60$
$N_{30}=27-43$
$N_{35}=20-43$.

According to a preferred embodiment of the present invention the stearin obtained by fractionation of the randomly interesterified blend is recirculated.

One way of re-using the stearin according to the invention involves:

(i) hydrogenating the stearin to obtain a fat having substantially the same slip melting point as the saturated oil used in the mixture subjected to interesterification and an iodine value of less than 10 and preferably less than 5;

(ii) subjecting a mixture consisting of appropriate proportions of the hydrogenated stearin and oil (i) to random interesterification;

(iii) fractionating interesterified mixture (A) under conditions such as to obtain an olein comparable to the olein (B) as defined above, which is subsequently mixed with a proportion of interesterified mixture (A) and optionally an oil (C) to obtain a margarine fat blend.

Another way of re-using the stearin according to the invention involves (i) subjecting appropriate proportions of the stearin as such and oil (i) to random interesterification;

(ii) fractionating the interesterified mixture to obtain an olein fraction comparable to the olein (B) defined above; and optionally (iii) mixing appropriate proportions of the olein obtained and interesterified mixture (A) or oil (C) to obtain a margarine fat.

In step (c) of the process according to the invention preferably 30–70% of the olein (B) are mixed with 5–50% of (A) and 5–55% of (C), the sum of (A)+(B)+(C) being 100%.

In a preferred embodiment of the process according to the invention a margarine fat is produced from 100% of olein (B) obtained by random interesterification of oil (i), part of which is non-hydrogenated and part of which has been hydrogenated to a melting point ranging from 28° to 43° C., with a fully hydrogenated oil (ii), followed by a fractionation as hereinbefore defined, whereby the lower melting olein fraction is separated from the higher melting stearin. In the process according to the invention the various proportions of the components of the fat blend are chosen such that a fat blend is produced which preferably has the following fat solids profile: $N_{10}=20-60$; $N_{20}=5-25$; $N_{30}\leq 5$; $N_{35}\leq 2$.

The invention will now be illustrated by the following Examples, in which the solid fat contents are expressed in NMR-values determined essentially as described in Fette, Seifen, Anstrichmittel 80, 180–186 (1978). The method was however modified as regards the stabilization of the material before measurement. In all cases the fat was stabilized for 16 h at 0° C. and for 1 h at the measuring temperature.

The level of trans fatty acids was measured according to J.A.O.C.S. 54, 47 (1971) as elaidic acid content (isolated mono-trans).

The hardness of the fat blend was expressed in C-values and determined according to the method described in J.A.O.C.S. 36 (1959), pp. 345–348, Haighton et al.

EXAMPLE I

A mixture was produced from 46% of sunflower oil, 14% of sunflower oil hydrogenated to a melting point of 32° C. and 40% of sunflower oil hydrogenated to a melting point of 69° C.

This mixture was randomly interesterified at 120° C. under moisture-free conditions using 0.12 wt% of $NaOC_2H_5$. The interesterified mixture was subjected to dry-fractionation at 34° C., whereby a lower melting olein fraction and a higher melting stearin fraction were separated.

A margarine was produced by mixing 80 wt% of the olein fraction with 20 wt% of an aqueous phase. The W/O emulsion obtained was processed through Votator A- and C-units. The analytical data are summarized in Table I.

The margarine was submitted to a panel of experts, who assessed the melting behaviour, plasticity and consistency of the product. The margarine was found to be very satisfactory in all respects.

EXAMPLE II

Example I was repeated, with the exception that a margarine fat blend was produced from 70% of olein and 30% of sunflower oil.

The analytical results are summarized in Table I. This margarine was submitted to a panel of experts, who assessed the melting behaviour, plasticity and consistency of the product.

The margarine was found to be very satisfactory in all respects.

EXAMPLE III

A margarine fat blend was produced from: a non-interesterified mixture (C), consisting of 15% of sunflower oil, 12% of sunflower oil hydrogenated to 32° C.; 23% of a mixture (A), consisting of 70% of sunflower oil and 30% of sunflower oil hydrogenated to a melting point of 69° C., which has been subjected to random interesterification as outlined in Example I; and 50% of an olein fraction obtained by dry-fractionation at 35° C. of a mixture obtained by random interesterification of a mixture consisting of 65% of sunflower oil and 35% of sunflower oil hydrogenated to 69° C.

The analytical results are summarized in Table II.

The margarine was submitted to a panel of experts, who assessed the melting behaviour, plasticity and consistency of the product.

The margarine was found to be very satisfactory in all respects.

TABLE I

| Solids | Fat Mixture | | Margarine Fat | |
|---|---|---|---|---|
| | before inter-esterif. | after inter-esterif. | 100% olein Ex. I | 70% olein 30% SF Ex. II |
| $N_{10}$ | 54.7 | 61.1 | 54.4 | 37.7 |
| $N_{15}$ | 52.7 | 53.8 | 44.5 | 28.3 |
| $N_{20}$ | 49.2 | 41.5 | 23.3 | 13.0 |
| $N_{25}$ | 46.5 | 31.3 | 10.2 | 5.6 |
| $N_{30}$ | 43.1 | 22.5 | 4.0 | 2.5 |
| $N_{35}$ | 39.4 | 17.2 | 1.2 | 0.4 |
| GLC of f. acids (wt. %) | | | | |
| $C_{16}$ | 7.2 | | 7.7 | 6.8 |
| $C_{18:0}$ | 39.3 | | 29.7 | 23.5 |
| $C_{18:1}$ | 19.1 | | 26.0 | 24.4 |
| $C_{18:2}$ | 32.7 | | 32.5 | 41.5 |
| Trans level | | | 11% | 9% |
| C-value (g/cm$^2$) after 4 weeks at 10° C. | | | 1600 | 400 |
| % Triglycerides derived from 2 saturated fatty acids with 16-18 C-atoms and 1 di-unsaturated fatty acid with 16 or 18 C-atoms ($S_2U$) | | | 30 | 21 |
| Triglycerides derived from 3 saturated fatty acids with 16 or 18 C-atoms ($S_3$) | | | 2 | 2 |

TABLE II

| Solids | Margarine Fat Example III (wt. %) |
|---|---|
| $N_{10}$ | 36.6 |
| $N_{15}$ | 26.2 |
| $N_{20}$ | 11.9 |
| $N_{25}$ | 5.9 |
| $N_{30}$ | 3.6 |
| $N_{35}$ | 1.3 |
| Trans level (wt. %) | 7.5 |
| GLC fatty acids $C_{16}$ | 7.7 |
| $C_{18:0}$ | 22.5 |
| $C_{18:1}$ | 23.0 |
| $C_{18:2}$ | 43.1 |
| C-value after 4 weeks at 10° C. (g/cm$^2$) | 380 |
| Triglycerides (wt. %) derived from 2 saturated fatty acids with 16 or 18 C-atoms and 1 di-unsaturated fatty acid with 16 or 18 C-atoms ($S_2U$) | 22.3 |
| Triglycerides (wt. %) derived from 3 saturated fatty acids with 16 or 18 C-atoms ($S_3$) | 2 |

EXAMPLE IV

A mixture consisting of 61 wt.% sunflower oil, 15 wt.% sunflower oil hydrogenated to a melting point of 32° C. and 24 wt.% sunflower oil hydrogenated to a melting point of 69° C. was randomly interesterified and dry-fractionated at 34° C. under the conditions described in Example 1, to obtain an olein and a stearin.

A margarine fat was produced from 70 wt.% of said olein and 30% of the non-fractionated, randomly interesterified mixture described above.

A margarine was produced by emulsifying 80 wt.% of the margarine fat with 20% of an aqueous phase, to obtain a W/O emulsion, which was processed according to the procedure described in Example 1.

The analytical data are summarized in Table III.

The margarine was submitted to a panel of experts, who assessed the melting behaviour, plasticity and consistency of the product.

The margarine was found to be very satisfactory in all respects.

TABLE III

| Solids | Fat Mixture | | | Margarine Composition |
|---|---|---|---|---|
| | before inter-esterif. | after inter-esterif. | olein | |
| $N_{10}$ | 39.1 | 36.9 | 31.1 | 34.8 |
| $N_{15}$ | 36.5 | 25.8 | 19.5 | 23.5 |
| $N_{20}$ | 33.4 | 16.3 | 7.9 | 12.1 |
| $N_{25}$ | 29.9 | 10.0 | 3.8 | 6.2 |
| $N_{30}$ | 26.8 | 6.4 | 1.5 | 3.4 |
| $N_{35}$ | 23.1 | 4.7 | 0 | 1.2 |
| GLC of f. acids (wt. %) | | | | |
| $C_{16}$ | | | | 7.2 |
| $C_{18:0}$ | | | | 24.0 |
| $C_{18:1}$ | | | | 24.2 |
| $C_{18:2}$ | | | | 45.6 |
| Trans level | | | | 12 |
| C—value (g/cm$^2$) after 4 weeks at 10° C. | | | | 1400 |
| % Triglycerides derived from 2 saturated fatty acids with 16-18 C—atoms and 1 di-unsaturated fatty acid with 16 or 18 C—atoms ($S_2U$) | | | | 20 |
| Triglycerides derived from 3 saturated fatty acids with 16 or 18 C—atoms ($S_3$) | | | | 3 |

We claim:

1. A process for producing a margarine fat comprising:

(a) randomly interesterifying a mixture consisting of 35–84 wt.% of an oil (i) comprising an oil in which at least 20% of the fatty acid residues consist of linoleic acid and 16–65% of a fat (ii) in which at least 80% of the fatty acid residues are saturated and have a chain length of at least 16 carbon atoms, to obtain an interesterified mixture (A);

(b) fractionating interesterified mixture (A) at a temperature such as to yield a higher-melting stearin fraction which is enriched in triglycerides from trisaturated fatty acid residues and a lower-melting olein fraction (B) in which the level of triglycerides from trisaturated fatty acids ranges from 0 to 6%, based on the total mixture;

(c) mixing 20 to 100% of said olefin fraction (B) with 5 to 50% of the interesterified mixture (A) and 5 to 55% of an oil (C) comprising an oil which is substantially free from crystallized fat at 10° C., or a mixture of said oil with an oil having a melting point ranging from 28° to 43° C., the sum of A+B+C being 100%.

* * * * *